United States Patent
Hobel et al.

(10) Patent No.: US 6,765,056 B2
(45) Date of Patent: Jul. 20, 2004

(54) AQUEOUS CROSS-LINKABLE BINDER COMPOSITION AND ITS USE IN THE PRODUCTION OF LACQUER COATINGS

(75) Inventors: Klaus Hobel, Oosterbeek (NL); Josephus Christiaan Van Oorschot, Arnhem (NL); Keimpe Jan Van Den Berg, Sassenheim (NL)

(73) Assignee: Akzo Nobel N.V., Arnhem (NL)

( * ) Notice: Subject to any disclaimer, the term of this patent is extended or adjusted under 35 U.S.C. 154(b) by 194 days.

(21) Appl. No.: 09/928,616

(22) Filed: Aug. 13, 2001

(65) Prior Publication Data

US 2002/0040093 A1 Apr. 4, 2002

(30) Foreign Application Priority Data

Aug. 11, 2000 (EP) ............................................. 00202821

(51) Int. Cl.$^7$ .......................... C08L 75/10; C08L 61/22; C08L 6/32
(52) U.S. Cl. ........................ 524/591; 524/597; 524/598; 524/840; 524/843; 525/377; 525/379; 525/383
(58) Field of Search ................................. 524/598, 597, 524/840, 843, 591; 525/377, 379, 383

(56) References Cited

U.S. PATENT DOCUMENTS

| | | | |
|---|---|---|---|
| 3,392,148 A | | 7/1968 | Zech et al. ................... 260/67 |
| 5,147,925 A | * | 9/1992 | Pears et al. .................. 524/589 |
| 5,147,926 A | | 9/1992 | Meichsner et al. .......... 524/591 |
| 5,552,496 A | | 9/1996 | Vogt-Birnbrich ............ 525/440 |

FOREIGN PATENT DOCUMENTS

| | | |
|---|---|---|
| CA | 2219835 | 5/1998 |
| EP | 0 332 326 A2 | 9/1989 |
| EP | 0 367 051 A1 | 5/1990 |
| EP | 0 442 652 A2 | 8/1991 |
| EP | 0 584 818 A1 | 3/1994 |
| EP | 0 678 105 B1 | 10/1995 |
| EP | 0 844 261 A1 | 5/1998 |
| WO | WO 96/41833 | 12/1996 |

* cited by examiner

Primary Examiner—Tae H. Yoon
(74) Attorney, Agent, or Firm—Joan M. McGillycuddy

(57) ABSTRACT

The aqueous-based cross-linkable binder composition comprising (A) an aqueous dispersion of an aldehyde-functional polyurethane having a number average molecular weight of more than 1,000 and an average aldehyde functionality of $\geq 2$, which polyurethane comprises ionic and/or non-ionic dispersing groups, and (B) a low-molecular weight aldehyde-reactive cross-linker selected from the group of low-molecular weight polyamines and low-molecular weight compounds comprising at least one group of one of the formulae $E^1$—$CHR^1$—$E^2$ and H—C—($E^1E^2E^3$), wherein —$E^1$, —$E^2$ and —$E^3$ are independently chosen from electron-withdrawing groups such as —P(=O)—O—, —CO—, —CN, —$SO_2$—, —$NO_2$ and wherein $R^1$ has the meaning of hydrogen or a hydrocarbon radical having 1 to 10 carbon atoms.

Preference is given to a coating composition wherein the ionic dispersing group is an anionic dispersing group selected from the group of carboxylate, sulphonate and/or phosph(on)ate salt groups, and/or wherein for the nonionic dispersing group use is made of a $C_1$–$C_4$ alkoxy poly $C_2$–$C_3$ alkylene-oxide group in an amount between 2.5 and 20 wt. %, based on the polyurethane.

14 Claims, No Drawings

AQUEOUS CROSS-LINKABLE BINDER COMPOSITION AND ITS USE IN THE PRODUCTION OF LACQUER COATINGS

CROSS REFERENCE TO RELATED APPLICATION

This application claims priority of European Application No. 00202821.5, filed on Aug. 11, 2000.

BACKGROUND OF THE INVENTION

The invention relates to an aqueous-based cross-linkable binder composition and to its use in the production of lacquer coatings.

1. Field of the Invention

Aqueous cross-linkable binder compositions comprising aqueous polyurethane dispersions are well known for the production of film coatings for various substrates such as metal and plastics. Though high-quality coating layers can be obtained with the known aqueous-based binder compositions, the properties of the aqueous polyurethane dispersions used in the known compositions are still a subject for improvement, especially in the field of automotive refinishing shops. Such improvement may concern reducing their excessive foaming when applied via spraying, the amount of organic solvent (VOC), the toxicity of one or more of the components in the binder composition, and/or the curing speed at ambient temperature (RT).

2. Discussion of the Prior Art

It should be noted that aldehyde-terminated polyurethanes have been disclosed earlier in U.S. Pat. No. 3,392,148. The cured resins are said to be useful as protective coatings, mouldings, and adhesives for laminates and the like. The compositions are prepared by the addition reaction of hydroxy-aldehydes with polyisocyanates. The non-aqueous compositions are cured with the aid of an acid catalyst or with a material which will liberate an acid on heating up to about 100–200° C. Not the slightest allusion is made to the fact that aqueous-based cross-linkable binder compositions curable at ambient temperature can be obtained by starting from an aldehyde-terminated polyurethane having a number average molecular weight of more than 1,000 and an average aldehyde functionality of $\geq 2$ which comprises ionic and/or non-ionic dispersing groups, and adding a low-molecular weight cross-linker containing aldehyde reactive groups.

EP-A-0 332 326 discloses an aqueous self-cross-linkable coating composition comprising an aqueous dispersion which comprises at least one polyurethane polymer with hydrazine-functional groups and carbonyl-functional groups. The carbonyl-functional groups may be present in the same polyurethane polymer as the hydrazine-functional groups or not.

EP-A-0 367 051 discloses aqueous storage-stable, carbonyl groups-containing cross-linkable polyurethane dispersions. The carbonyl groups may be derived from hydroxyacetone, hydroxybenzaldehyde, acetoin, benzoin, adducts of diepoxides to ketocarboxylic acids. The polyurethanes are dispersed in water in the presence of ammonia or organic amines such as trialkyl amines, e.g. trimethyl amine, triethyl amine, or hydroxyalkyl amines such as trishydroxyethyl amine or mixtures thereof. For the cross-linker use is made of polyhydrazides. In using such dispersions for coating applications, however, coatings result with an appearance that is subject to improvement. Besides, polyurethanes based on β-hydroxyketones can become unstable over time and decompose during storage with elimination of $CO_2$.

EP-A-0 442 652 discloses aqueous coating compositions comprising aqueous polyurethane dispersions in which the polyurethane polymer has chain-pendant or in-chain groups Y with, in all examples, a chain-extending compound having three or more independently reactable enolic carbonyl groups, so that those not taking part in the chain extension will end up as lateral carbonyl-containing groups in the chain-extended polymer. The only chain-extender compound used in the examples is prepared from trimethylol propane triacetoacetate. Not the slightest allusion is made to the substitution of aldehyde groups for said triacetoacetate groups providing the composition with an improved water stability.

EP-A-0 584 818 discloses an aqueous self-drying and, optionally, cross-linkable coating composition for, e.g., multilayer lacquering of, e.g., repaired cars. The coating composition comprises an aqueous dispersion of a polyurethane resin of number average mol. wt. (Mn) between 2,500 and 1,000,000 containing at least one CH acid group per molecule. The cross-linker comprises an at least 2-functional aldehyde or a free or blocked polyisocyanate with on average 1.5 isocyanate functions per molecule. Preferably, the aldehyde is formaldehyde and/or glyoxal and the polyisocyanate is diisocyanate.

WO 96/41833 discloses a binder composition comprising a strongly activated carbanion-functional polymer and an aldehyde groups-containing cross-linker.

SUMMARY OF THE INVENTION

The invention now provides binder compositions which have an acceptable foaming behaviour and curing speed at ambient temperature, which compositions comprise (A) an aqueous dispersion of an aldehyde-functional polyurethane having a number average molecular weight of more than 1,000 and an average aldehyde functionality of $\geq 2$, which polyurethane comprises ionic and/or non-ionic dispersing groups, and (B) a low-molecular weight aldehyde-reactive cross-linker selected from the group of low-molecular weight polyamines and low-molecular weight compounds comprising at least one group of one of the formulae $E^1$—$CHR^1$—$E^2$ and H—C—($E^1E^2E^3$), wherein —$E^1$, —$E^2$ and —$E^3$ are independently chosen from electron-withdrawing groups such as —P(=O)—O—, —CO—, —CN, —$SO_2$—, —$NO_2$ and wherein $R^1$ has the meaning of hydrogen or a hydrocarbon radical having 1 to 10 carbon atoms.

Preference is given to a cross-linker comprising acetoacetate groups.

The carbanion-functional groups preferably are acetoacetate groups, malonate groups, acetonate groups or mixtures thereof. The polymer is an alkyd resin or a polyester resin.

DETAILED DESCRIPTION OF THE INVENTION

Thus far good results have been obtained with an aqueous-based cross-linkable binder composition when the number average molecular weight of the aldehyde-functional polyurethane is in the range of from 1,000 to 100,000.

Preference is given to a binder composition the aldehyde-functional polyurethane of which is obtainable by reaction of:

a) an organic polyisocyanate, b) an organic compound containing at least two isocyanate-reactive groups and having a number average molecular weight in the range of 400 to 6,000, c) (a) mono-functional and/or poly-functional isocyanate-reactive compound(s) bearing nonionic and/or ionic dispersing groups (or groups which may subsequently be converted into such dispersing groups), d) an isocyanate-reactive aldehyde-functional compound, e) optionally, an organic polyol having a weight average molecular weight of less than 400, and f) optionally, active hydrogen-containing chain extending material.

The polyisocyanate (a) used in making the polyurethane polymer may be an aliphatic, cycloaliphatic or aromatic di-, tri- or tetraisocyanate that may or may not be ethylenically unsaturated, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, ω,ω'-dipropylether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexyl methane-4,4'-diisocyanate, toluene diisocyanate, 1,3-bis(isocyanatomethyl) benzene, xylylene diisocyanate, 1,5-dimethyl-2,4-bis(2-isocyanatoethyl) benzene, 1,5-dimethyl-2,4-bis(2-isocyanatoethyl) benzene, 1,3,5-triethyl-2,4-bis (isocyanatomethyl) benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenyl methane, 3,3'-dimethyl-4,4'-diisocyanatodiphenyl methane, diisocyanatonaphthalene, the adduct of 2 molecules of a diisocyanate, for example hexamethylene diisocyanate or isophorone diisocyanate, to a diol such as ethylene glycol, the adduct of 3 molecules of hexamethylene diisocyanate to 1 molecule of water (available under the trademark Desmodur N of Bayer), the adduct of 1 molecule of trimethylol propane to 3 molecules of toluene diisocyanate (available under the trademark Desmodur L of Bayer), the adduct of 1 molecule of trimethylol propane to 3 molecules of isophorone diisocyanate, compounds such as 1,3,5-triisocyanatobenzene and 2,4,6-triisocyanatotoluene, and the adduct of 1 molecule of pentaerythritol to 4 molecules of toluene diisocyanate. It is preferred that use be made of an aliphatic or cycloaliphatic di- or triisocyanate containing 8–36 carbon atoms. Mixtures of polyisocyanates can be used and also polyisocyanates which have been prepared by the introduction of urethane, allophanate, urea, biuret, carbodiimide, uretonimine or isocyanurate residues. Examples include triisocyanate, such as Tolonate HDT/LV (isocyanurate of hexamethyl diisocyanate) and Vestanate T1890 (isocyanurate of isophorone diisocyanate).

The organic compounds (b) containing at least two isocyanate-reactive groups and having a number average molecular weight in the range of 400 to 6,000 which may be used in the preparation of the polyurethane polymer preferably are polymeric organic polyols terminated by hydroxyl groups. The organic polyols particularly include diols and triols and mixtures thereof but higher-functionality polyols may be used, for example as minor components in admixture with diols. The polyols may be selected from the group of polyesters, polyester amides, polyethers, polythioethers, polycarbonates, polyacetals, polyolefins, and polysiloxanes. Preference is given to polyols having a number average molecular weight in the range of 700 to 3,000. Polyester polyols which may be used include hydroxyl-terminated reaction products of polyhydric alcohols, such as ethylene glycol, propylene glycol, diethylene glycol, neopentyl glycol, 1,4-butanediol, 1,6-hexanediol, furan dimethanol, dimethylol cyclohexane, glycerol, trimethylol propane or pentaerythritol or mixtures thereof with polycarboxylic acids, especially dicarboxylic acids or their ester-forming derivatives, for example succinic, glutaric, and adipic acids, or their dimethyl esters, phthalic anhydride, hexahydrophthalic anhydride or dimethyl terephthalate. Polyesters obtained by the polymerisation of lactones, for example caprolactone, in conjunction with a polyol, may also be used.

Polyester amides may be obtained by the inclusion of aminoalcohols such as ethanol amine in the polyesterification mixtures.

Suitable polyether polyols include polyC$_2$(C$_3$)alkylene oxide glycol and/or polyC$_2$(C$_3$)alkylene oxide glycol 1,3-diol, wherein polyC$_2$(C$_3$)alkylene oxide stands for polyethylene oxide, optionally comprising propylene oxide units.

Polythioether polyols which may be used include products obtained by condensing thiodiglycol either alone or with other glycols, dicarboxylic acids, formaldehyde, aminoalcohols or aminocarboxylic acids.

Polycarbonate polyols include products obtained by reacting diols, such as 1,3-propane diol, 1,4-butane diol, 1,6-hexane diol, 1,4-cyclohexane dimethanol, diethylene glycol or tetraethylene glycol, with diaryl- or dialkyl carbonates, for example diphenyl carbonate, or with phosgene.

Suitable polyolefin polyols include hydroxy-terminated butadiene homo- and copolymers. Examples of polysiloxanes include Tegomer H-Si 2110 from Goldschmidt AG.

In order to ensure that the polyurethane is self-dispersible in water, (a) mono-functional and/or poly-functional isocyanate-reactive compound(s) (c) bearing nonionic and/or ionic dispersing groups (or groups which may be subsequently converted into such dispersing groups) is/are included as reactant(s) in the preparation of the polyurethane.

Suitable nonionic dispersing groups are the mono C$_1$–C$_4$ alkoxy derivatives of the polyether polyols disclosed above. Preferably, the polyurethane comprises 2.5 to 20 wt. % of C$_1$–C$_4$ alkoxy polyC$_2$(C$_3$)alkylene oxide groups. The number average molecular weight may range from 500 to 3,000. Preference is given to a polyurethane comprising 5 to 15 wt. % of C$_1$–C$_4$ alkoxy polyC$_2$(C$_3$)alkylene oxide groups. Optimum results are obtained with a polyurethane wherein the polyC$_2$(C$_3$)alkylene oxide units are polyethylene oxide units.

Suitable C$_1$–C$_4$ polyC$_2$(C$_3$)alkylene oxide compounds contain at least one hydroxyl group such as polyethylene oxide monomethyl ethers. Examples of diols are methoxy polyethylene oxide-1,3-diols such as Tegomer® D-3123 (PO/EO=15/85; Mn=1,180), Tegomer® D-3409 (PO/EO=0/100; Mn=2,240), and Tegomer® D-3403 (PO/EO=0/100; Mn=1,180) available from Goldschmidt AG, Germany. Also low-molecular weight polyesters containing polyalkylene oxide groups may be used such as those based on the adduct of a polycarboxylic acid, a polyol, and the above-mentioned C$_1$–C$_4$ polyC$_2$(C$_3$)alkylene oxides. Examples of polycarboxylic acids include dicarboxylic acids or their ester-forming derivatives, for example succinic, glutaric, and adipic acids, or their dimethyl esters, phthalic anhydride, hexahydrophthalic anhydride or dimethyl terephthalate, or mixtures thereof. Examples of the polyol include ethylene glycol, propylene glycol, diethylene glycol, neopentyl glycol, 1,4-butanediol, 1,6-hexanediol, furan dimethanol, dimethylol cyclohexane, glycerol, di(trimethylolpropane), trimethylol propane or pentaerythritol or mixtures thereof.

By low-molecular weight polyester is meant a polyester of a number average molecular weight lower than 1,500.

Suitable ionic dispersing groups are anionic salt groups, e.g., carboxylate, sulphonate and/or phosph(on)ate salt groups which may, e.g., be provided by employing them as a reactant in the polymer formation. Examples of such compounds are carboxy groups containing diols and triols, for example dihydroxy alkanoic acids. Preference is given to 2,2-dimethylol propionic acid. Sulphonate based ionic groups are more preferred, due to the potentially lower demand for basic cross-linking catalyst.

The acid value of the polyurethane comprising ionic dispersing groups may range from 0 to 25 (on solids) and is preferably from 5 to 15 (on solids). If desired, the carboxy-containing diol or triol may be incorporated into a polyester by reaction with a dicarboxylic acid before incorporation into the polyurethane.

The conversion of any acid groups present in the polyurethane to anionic salt groups may be effected by neutralising said acidic groups before, after (if in combination with nonionic stabilisation) or simultaneously with the formation of an aqueous dispersion of the polymer.

As isocyanate-reactive aldehyde-functional compounds (d) may be used hydroxymethyl furfural, 5-hydroxy pentanal, 2,5-dimethyl-2-hydroxy adipaldehyde, 3(β-hydroxyethoxy) propanal, β-hydroxyethoxy acetaldehyde, and the aldol condensation products, such as 3-hydroxybutanal and 3-hydroxy-2-methylpentanal. Thus far optimum results have been obtained with 3,7-dimethyl-7-hydroxyoctanal. The aldehyde functionality of the isocyanate-reactive aldehyde-functional compounds may optionally be blocked, e.g. by the formation of lower alkyl (C1–C6) acetals. The deblocking step (hydrolysis) of the acetal may be carried out prior to the polyurethane synthesis, after polymer formation or after emulsification. Aromatic aldehyde derived resins are less reactive than aliphatic aldehyde derived resins, therefore preferably use is made of aliphatic aldehyde derived polyurethanes.

Organic polyols (e) having a weight average molecular weight of less than 400 which may optionally be used in the preparation of the polyurethanes include diols and triols and mixtures thereof, but higher-functionality polyols may also be used. Examples of such lower-molecular weight polyols include ethylene glycol, diethylene glycol, tetraethylene glycol, bis(hydroxyethyl) terephthalate, cyclohexane dimethanol, furan dimethanol, glycerol, and the reaction products up to molecular weight 400 of such polyols with propylene oxide and/or ethylene oxide.

As active hydrogen-containing chain extending material (f), compounds bearing groups which are reactive with the free-NCO groups in the polyurethane can be used. The chain extender may be water, but also a polyol, a polyamine or a polythiol. Examples thereof include hydrazine, ethylenediamine, isophorone diamine, 1,2- and 1,3-propane diamine, 1,6-hexane diamine, 1,2-ethane dithiol, 1,6-hexane dithiol, 1,6-hexane diol-(bis)3-mercaptopropionate.

The polyurethane dispersions according to the invention may be prepared in a conventional manner by reacting a stoichiometric amount or an excess of the organic polyisocyanate (a) with the polymeric organic compound (b) having at least two isocyanate-reactive groups having a molecular weight in the range of 400 to 6,000 and the other required reactants under substantially anhydrous conditions at a temperature between about 30° C. and about 130° C. until the reaction between the isocyanate groups and the isocyanate-reactive groups is substantially complete. Dosing of the reactants may be preferred, particularly on a larger scale, in order to control the exothermic reaction. If a number of compounds are monofunctional, it is preferred to first have them react and subsequently add the polyfunctional compounds to the reaction mixture to acquire a favourable molecular weight range. More preferred is to first have compounds (a) and (d) react and to subsequently add compounds (c) and (b). If a chain-extended polyurethane is prepared, it may be advantageous to first produce an isocyanate-terminated prepolymer. During the production of the isocyanate-terminated prepolymer or polyurethane resin with complete isocyanate conversion the reactants are generally used in proportions corresponding to a ratio of isocyanate groups to isocyanate-reactive groups of from about 1:1 to about 6:1, preferably from about 1:1 to 3:1. The chain extension can be conducted at elevated, reduced or ambient temperatures. Convenient temperatures are from about 5° C. to 95° C. or, more preferably, from about 10° C. to about 45° C.

Polyurethanes which incorporate aldehyde functionality preferably contain a proportion of aldehyde groups in the polymer in the range of 3 to 200 milli-equivalents, preferably 6 to 100 milli-equivalents, per 100 g of polyurethane polymer.

Low-molecular weight aldehyde-reactive cross-linker compounds are defined as compounds having a number average molecular weight of 100 to 3,000, preferably 150 to 2,500.

Suitable polyamine compounds include alkylene diamines. The term alkylene group in this context also refers to a cycloalkylene group or an alkylene group containing one or more ether-oxygen atoms. Preferred are α,ω-alkylenediamines having from 2 up to 20 carbon atoms in the alkylene group, such as ethylene diamine, propylene diamine, butylene diamine, pentamethylene diamine, hexamethylene diamine, decamethylene diamine, 4,7-dioxadecane-1,10 diamine, dodecamethylene diamine, 4,9-dioxadodecane-1,12 diamine, 7-methyl-4,10-dioxatridecane-1,13 diamine; 2-methyl piperazine; cyclohexylene diamines such as 1,2-diaminocyclohexane, 1,4-diaminocyclohexane and 4,4'-diaminodicyclohexyl methane; isophorone diamine, bis(3-methyl-4-aminocyclohexyl) methane, 2,2-bis(4-aminocyclohexyl) propane, nitrile tris(ethane amine), bis(3-aminopropyl) methylamine, 3-amino-1-(methylamino) propane, 3-amino-1-(cyclohexyl-amino) propane, N-(2-hydroxyethyl)-ethylene diamine, and polyamines of the formula $H_2N-(R^2-NH)_n-R^1-NH_2$, wherein the group $R^1$ and the n groups $R^2$ may be the same or different and represent an alkylene group containing 2–6 and preferably 2–4 carbon atoms and n is a number from 1–6 and preferably 1–3. Again, the term alkylene group in this context also refers to a cycloalkylene group or an alkylene group containing an ether-oxygen atom. Examples of these polyalkylene polyamines include diethylene triamine, dipropylene triamine, dibutylene triamine, Jeffamine® T403 ex Huntsman, trisaminomethylamine, and 5-aminomethyl octane diamine-1,8. It is more preferred that the polyamines according to the present invention are of a (cyclo)aliphatic nature and contain 5–15 carbon atoms, such as isophorone diamine; more particularly such polyamines should contain an α-alkyl group, such as bis(3-methyl-4-aminocyclohexyl) methane and bis(3-methyl-4-aminocyclohexyl) propane. Other suitable polyamines are the adducts of a (poly)amino compound to a polyfunctional epoxy, isocyanate, maleinate, fumarate or (meth)acryloyl compound or those which are obtainable by hydrogenation of polynitro compounds such as disclosed in EP-B-0 678 105 or by hydrogenation of polynitriles obtainable by a Michael addition reaction of for instance polyols or polythiols with acrylonitrile. Thus far very good results have been obtained when the cross-linker used was 3-[2,2-bis-(3-amino-propoxymethyl)-butoxy]-propylamine, i.e. the hydrogenated reaction product of the Michael adduct of trimethylol propane and three moles of acrylonitrile.

Examples of suitable low-molecular weight aldehyde-reactive cross-linkers comprising a group of the formula $E^1$—$CHR^1$—$E^2$, wherein —$E^1$ and —$E^2$ are independently chosen from electron-withdrawing groups such as —P(=O)—O—, —CO—, —CN, —$SO_2$—, —$NO_2$ and wherein $R^1$ has the meaning of hydrogen or a hydrocarbon radical having 1 to 10 carbon atoms, include compounds comprising groups selected from —CO—$CHR^1$—CO—, NC—$CHR^1$—CO—, —O—P(=O)—$CHR^1$—CO—, —O—P(=O)—$CHR^1$—P(O=)—O—, and —CO—$CHR^1$—$NO_2$.

Examples of $R^1$ being a hydrocarbon radical includes alkyl groups having 1 to 10 carbon atoms, such as methyl, ethyl, propyl, and butyl.

Such low-molecular weight aldehyde-reactive cross-linkers include acids such as acetoacetic acid, acetone dicarboxylic acid, phosphonic acid, cyanoacetic acid, and malonic acid, alkyl- or aryl-substituted derivatives of the above acids preferably having 1–6 carbon atoms in the alkyl radical, as for example methyl, ethyl, and n-butyl, such as α-methyl acetoacetic and γ-methyl acetoacetic acid, or 6–10 carbon atoms in the aryl radical, as for example phenyl, ketones, such as acetyl acetone, benzoyl acetone or acetyl dibenzoyl methane, and (partial) amides of the aforementioned acids such as acetoacetamide.

Also included are (partial) esters of the acids mentioned above. Alcohols which are suitable for the esterification of the above acids are monohydric and polyhydric alcohols. The monohydric and polyhydric alcohols are well known and any of the known compounds can be used. Preferably these alcohols contain 1 to 50 carbon atoms, more preferably 1 to 15 carbon atoms. As examples of the alcohols may be mentioned methanol, ethanol, butanol, octanol, ethylene glycol, propylene glycol, trimethylol ethane, trimethylol propane, 1,2,6-hexane triol, glycerol, diethylene glycol, 2,2'-bis-4-dihydroxyphenyl propane, 1,5-pentane diol, pentaerythritol, polyoxyalkylene polyols formed by the reaction of alkylene oxides with polyhydric alcohols, for example the reaction of ethylene oxide or propylene oxide with ethylene glycol; trifunctional products such as those resulting from the reaction of propylene oxide with glycerol; polycaprolactone polyols such as those resulting from the reaction between propylene glycol and ε-caprolactone, and α-ω-dihydroxy(alkyl)polysiloxanes.

Some of the above alkyl-substituted esters, for example α-methyl acetoacetic esters or α, γ-dimethyl acetoacetic esters, contain only one active H atom and therefore are preferably employed in the form of diesters or diamides or polyesters of polyhydric alcohols or polyamides or polyamines, in order to make available a sufficient number of reactive groups.

Further examples of suitable compounds are the reaction products of the above-mentioned acids with (poly)acrylates, polyesters, polyethers, polyester amides, polyester imides, and polyhydroxyl amines. Also included are nitriles based on acetoacetic acid, phosphonic acid and/or malonic acid, such as malonic acid mononitrile or dinitrile.

Preference is given to low-molecular weight polyacetoacetate compounds obtainable by reacting diketene or an alkyl acetoacetate with a polyol having two or more hydroxyl groups. Illustrative examples of suitable non-polymeric poly- or alkyl-acetoacetates are trimethylol propane triacetoacetate, trimethylol ethane triacetoacetate, ethane diol bisacetoacetate, trimethylol propane triacetoacetate, 1,2,6-hexane triol triacetoacetate, bisacetoacetate of diethylene glycol, bisacetoacetate of 2,2'-bis-4-hydroxyphenyl propane, 1,5-pentanediol diacetoacetate, and pentaerythritol tetracetoacetate.

Examples of aldehyde-reactive cross-linkers comprising a group of the formula H—C—$(E^1E^2E^3)$ wherein —$E^1$, —$E^2$ and —$E^3$ are independently chosen from electron-withdrawing groups such as —P(=O)—O—, —CO—, —CN, —$SO_2$—, —$NO_2$, and wherein $R^1$ has the meaning of hydrogen or a hydrocarbon radical having 1 to 10 carbon atoms include polyesters made of methane triscarboxylic acid or its esters.

The reaction between the aldehyde-functional polyurethane and the low-molecular weight aldehyde-reactive cross-linker comprising at least one group of one of the formulae $E^1$—$CHR^1$—$E^2$ and H—C—$(E^1E^2E^3)$ is carried out in the presence of a basic catalyst having a pKa≧9. Preferred compounds are amines of the amidine type, for example, tetramethyl guanidine, 1,4-dihydropyrimidines, 1,8-diaza-bicyclo[5.4.0]undec-7-ene, 1,4-diazabicyclo[2.2.2]octane, 2-alkyl-N-alkyl imidazolines, and adducts of epoxy compounds to tertiary amines such as the reaction product of Epikote 828® (ex Shell) with 1,4-diaza-bicyclo[2,2,2]octane.

Other preferred catalysts include quaternary ammonium compounds, for example quaternary ammonium hydroxides such as tetrabutyl ammonium hydroxide; quaternary ammonium alkoxides such as benzyl trimethyl ammonium methoxide and dilauryl dimethyl ammonium methoxide; and quaternary ammonium carbanions such as benzyl trimethyl ammonium acetyl acetate. The amount used varies from 0.05 wt. % to about 10.0 wt. %, preferably from about 0.05 wt % to about 6 wt %, more preferably from about 0.1 wt. % to about 4.0 wt. %, based upon the combined weight of components (A) and (B) (on solids).

The reaction between the aldehyde-functional polyurethane and the low-molecular weight polyamine cross-linker may be carried out without a catalyst.

Preferably, the aldehyde-functional polyurethane to low-molecular weight aldehyde-reactive cross-linker equivalence ratio, based on the aldehyde-reactive groups of the low-molecular weight cross-linker and the aldehyde groups of the polyurethane, is in the range of from 0.5:1 to 5:1.

The aqueous-based cross-linkable binder composition according to the invention is prepared by dispersing the polyurethane, which is dissolved or dispersed in an organic solvent, in water, followed by the evaporation of all or most of the remaining solvent. The cross-linker may be mixed into the polyurethane solution or dispersion by any suitable technique. However, simply stirring usually is sufficient. Sometimes it may be useful to dilute the solution or dispersion of the binder composition somewhat with an organic solvent such as ethyl acetate or 1-methoxy-2-propyl acetate to reduce its viscosity.

If a catalyst is used, such a catalyst is added to the aldehyde-functional polyurethane emulsion, which may already contain the aldehyde-reactive functional cross-linker or not.

The composition of the present invention, being an aqueous composition, consists essentially of water. However, about 20 wt. % of liquid content of the composition may be an organic solvent. As suitable organic solvents may be mentioned dimethyl dipropylene glycol, methyl ether of diacetone alcohol, ethyl acetate, butyl acetate, ethyl glycol acetate, butyl glycol acetate, 1-methoxy-2-propyl acetate, butyl propionate, ethoxyethyl propionate, toluene, xylene, methylethyl ketone, methylisobutyl ketone, methylamyl ketone, ethylamyl ketone, dioxolane, N-methyl-2-pyrrolidone, dimethyl carbonate, propylene carbonate, butyrolactone, caprolactone, and mixtures thereof. The VOC of the composition may range from 0 to 400 g/l, preferably from 0 to 250 g/l.

The binder compositions according to the present invention may also comprise mixtures of different aldehyde-functional polyurethanes and mixtures of low-molecular weight aldehyde-reactive cross-linkers.

Films obtained from these compositions were foam-free at a thickness of up to at least 60 μm.

Preferably, the compositions according to the invention are 2-component compositions wherein component (A) is an aqueous dispersion of an aldehyde-functional polyurethane and component (B) is non-aqueous. More preferably, component B is used as a low-viscous resin, thus being both solvent-free and water-free.

For use in coating compositions the binder compositions may further comprise other ingredients, additives or auxiliaries, such as other polymers or polymer dispersions which may or may not contain reactive groups such as epoxy or unsaturated (meth)acrylate groups which can react with one or more of the other binder components, pigments, waxes, solvents, flow additives, neutralising agents, defoamers, wetting agents, dyes, emulsifiers (surfactants), pigment dispersion aids, levelling agents, anti-cratering agents, anti-foaming agents, anti-sagging agents, heat stabilisers, UV absorbers, light stabilisers, anti-oxidants, and fillers. Suitable types of other polymer dispersions include acrylic polymer emulsions and aqueous polyurethane dispersions.

The coating composition of the present invention may be applied to any substrate. The substrate may be, for example, metal, plastic, wood, glass, ceramic, or some other coating layer. The other coating layer may be comprised of the coating composition of the current invention or it may be a different coating composition. The coating compositions of the current invention show particular utility as clear coats, base coats, pigmented top coats, primers, and fillers. The coating compositions can be applied by conventional means such as by spray gun, brush, or roller, spraying being preferred. Curing temperatures preferably are between 0 and 80° C. and more preferably between 20 and 60° C. The compositions are particularly suitable in the preparation of coated metal substrates, such as in the refinish industry, in particular the body shop, to repair automobiles and transportation vehicles, and in finishing large transportation vehicles such as trains, trucks, buses, and aeroplanes. Preferably, the coating composition is used as a primer.

The invention will be illustrated with reference to the following examples. Of course these examples are submitted for a better understanding of the invention only; they are not to be construed as limiting in any manner the scope thereof.

EXAMPLES

In the following examples, the preparation of a number of water borne polyurethane dispersions and binder compositions according to the invention is disclosed. The dispersions were characterised by their solids content, molecular weight, viscosity, and particle size. The dispersions' average particle size was determined with a Coulter LS230 particle size analyser. The viscosity was determined with a Brookfield CAP 2000 viscometer (LV—4; 60 revolutions per minute).

The solids content was determined in accordance with ASTM method no. 1644-59, with a Sartorius MA 30 moisture analyser at a temperature of 140° C.

Molecular weight determinations were carried out by gel permeation chromatography on a Waters 2690 instrument, equipped with a Waters 2410 refractive index detector unit and a column type PL1000, available from Polymer Laboratories. Tetrahydrofuran with 0.5 weight % acetic acid served as eluent. The system was calibrated with a polystyrene standard.

Preparation of Aldehyde-functional Water Borne Polyurethane Dispersions

Polyurethane Dispersion 1 a) a 2-liter 4-neck flask was fitted with a variable speed stirrer, thermocouples in combination with a controller, a distillation column, a condenser, a nitrogen sparge, and a heating mantle. In the flask were placed 836.0 g of hexahydrophthalic anhydride, 962.5 g of 1,6-hexane diol, and 0.45 g of dibutyl tin oxide. The mixture was heated to 250° C. with stirring and under nitrogen flow and was kept at this temperature for 4 hours with water being distilled off. Then the mixture was allowed to cool to room temperature. Obtained was a clear, colourless polyester 1a with an acid number of 1.6 mg KOH/g, a hydroxyl number of 179 mg KOH/g, GPC data Mn 990, Mw 1,600.

b) a 5-liter 4-neck flask was fitted with a variable speed stirrer, thermocouples in combination with a controller, a condenser, a nitrogen inlet and outlet, and a heating mantle. In the flask were placed 71.3 g of isophorone diisocyanate, 54.4 g of a trimer of hexamethylene diisocyanate (Tolonate HDT LV ex Rhodia), 49.1 g of 3,7-dimethyl-7-hydroxyoctanal, and 162.8 g of 2-butanone. The mixture was stirred until homogeneous and then 0.19 g tin(II)octanoate was added. The reaction exothermed and was further heated to 80° C. and kept at this temperature for 6 hours. After this time, the isocyanate content of the mixture was 7.9%. The reaction mixture was cooled to 30° C., and 46.7 g of polyethylene oxide glycol ($M_n$=1,180; Tegomer® D3403 ex Tego Chemie Service), 157.8 g of polyester diol 1a, and 4.5 g of dimethylol propionic acid were added, followed by the addition of another 0.19 g of tin(ll)octanoate. The mixture was heated to 80° C. for another 4 hours, after which an isocyanate content below 0.1% was measured. The mixture was cooled to 45° C., and 3.03 g of dimethyl ethanolamine were added. The stirrer was set to the highest speed, and 690 g of water were added at a rate of 10 ml/min. When the addition of water was complete, a distillation head and a vacuum pump were connected to the flask and the pressure was gradually lowered until all 2-butanone was distilled off.

A white emulsion with the following characteristics was obtained: Solids content 35%, Mn 3,310, Mw 19,000, viscosity 36 mPas, pH 8.6, particle size 134 nm.

Aldehyde equivalence weight: 1,333 g/eq (on solids), EO content: 10% (on solids).

Polyurethane Dispersion 2 a) in a manner analogous to that disclosed for the preparation of polyurethane dispersion 1, polyester diol 2a was prepared, with the proviso that this time the following ingredients were added:

719.1 g of hexahydrophthalic anhydride, 1,064.5 g of dimethylol cyclohexane, and 0.45 g of dibutyl tin oxide. The mixture was heated to 250° C. with stirring and under nitrogen flow and was kept at this temperature for 4 hours with water being distilled off. Then the mixture was allowed to cool to room temperature. Obtained was a clear, colourless polyester with an acid number of 0.4 mg KOH/g, a hydroxyl number of 179 mg KOH/g, GPC data Mn 910, Mw 1,430.

b) in a manner analogous to that disclosed for the preparation of polyurethane dispersion 1, an aldehyde-functional polyurethane dispersion was prepared, with the proviso that this time the following ingredients were added:

57.9 g of isophorone diisocyanate, 59.7 g of the trimer of isophorone diisocyanate (Vestanat® T1890 ex Creanova), 42.2 g of 3,7-dimethyl-7-hydroxyoctanal, and 138.4 g of 2-butanone. The mixture was stirred until homogeneous and then 0.16 g tin(ll)octanoate was added. The reaction exothermed and was further heated to 80° C. and kept at this temperature for 6 hours. After this time, the isocyanate content of the mixture was 6.9%. The reaction mixture was cooled to 30° C., and 36.6 g of polyethylene oxide glycol ($M_n$=1,180; Tegomer® D3403 ex Tego Chemie Service), 126.1 g of polyester 2a, and 3.9 g of dimethylol propionic acid were added, followed by the addition of another 0.16 g of tin(II)octanoate. The mixture was heated to 80° C. for another 4 hours, after which an isocyanate content below 0.1% was measured. The mixture was cooled to 45° C., and 2.58 g of dimethyl ethanolamine were added. The stirrer was set to the highest speed, and 600 g of water were added at a rate of 10 ml/min. When the addition of water was complete, a distillation head and a vacuum pump were connected to the flask and the pressure was gradually lowered until all 2-butanone was distilled off. A white emulsion with the following characteristics was obtained: solids content 36%, Mn 5,580, Mw 17,800, viscosity 24 mPas, pH 8.3, particle size 159 nm.

Aldehyde equivalent weight: 1,333 g/eq (on solids), EO content: 10% (on solids).

Preparation of Low-molecular Weight Aldehyde-reactive Cross-linkers

Preparation of 3-[2,2-bis-(3-amino-propoxymethyl)-butoxy]1-propylamine (polyamine cross-linker)

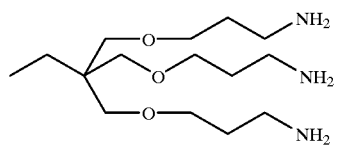

a) A 1-liter 4-neck flask was fitted with a variable speed stirrer, thermocouples in combination with a controller, a condenser, a nitrogen inlet and outlet, an addition funnel, and a heating mantle. In the flask were placed 48.0 g of trimethylol propane, which whole was heated to 60° C. Then 0.024 g sodium methoxide was added to the melt. 57.9 g of acrylonitrile were added in 1 hour. The exothermic reaction was kept between 60 and 70° C. by external cooling. After cooling to room temperature traces of precipitate were removed by vacuum filtration. $^1$H-NMR analysis of the intermediate product showed a conversion of 97% of all hydroxyl groups. The intermediate had a colour of <1 Gardner.

b) Hydrogenation of the intermediate product obtained under a) was carried out in a 2 l stainless steel autoclave with hydrogen and $NH_3$ dosing equipment, a pitch blade stirrer, and baffles for proper mixing. In the autoclave were placed 201.8 g of a 50 wt. % solution in 2-propanol of the addition product described above and 5 g of Raney Cobalt. Then 15 g of gaseous $NH_3$ were introduced into the autoclave, which subsequently was heated to 100° C. Hydrogen was then introduced into the reactor to maintain a total pressure of 50 bar. Hydrogenation was continued for 2 hours, during which time the reaction temperature was gradually increased to 150° C. After cooling to room temperature the Cobalt catalyst was removed by filtration and the filtrate was concentrated on a rotary evaporator until all 2-propanol was distilled off. The polyamine was obtained as a liquid with an amine number of 500 mg KOH/g. This liquid was diluted with water to give a clear solution of Gardner colour 2 and a solids content of 50 wt. %.

Preparation of the Coating Compositions

Coating composition A consisted of 20.1 g of polyurethane dispersion 1 and 19.1 g of polyurethane dispersion 2, to which were added 1.3 g of trimethylol propane triacetoacetate, 5.6 g of tetrabutyl ammonium hydroxide (TBAH as a 10% solution in water), and 0.20 g of BYK 346 as wetting agent. The equivalence ratio of aldehyde groups to acetoacetate groups was 1:1.

Coating composition B consisted of a mixture of 20.1 g of polyurethane dispersion 1 and 19.1 g of polyurethane dispersion 2, to which were added 2.2 g of the polyamine cross-linker disclosed hereinbefore and 0.21 g of BYK 346 as wetting agent. The equivalence ratio of aldehyde groups to amine groups was 1:1. Both compositions were applied on tin plated panels in a dry layer thickness of 80 μm (composition A) and 110 μm (composition B), respectively. The panels were allowed to dry at ambient (room) temperature for one day.

The Persoz Hardness of the obtained coating layers was determined in accordance with French industrial standard method NF T30-016, the result being expressed in seconds.

The resistance to methylethyl ketone (=2-butanone) and water was determined after 2 and 7 days of ageing and exposure for one minute (methylethyl ketone) or after 7 days of ageing and exposure for one hour (water).

The properties of the obtained coating layers are given in Table 1.

In the resistance test 0 stands for dissolved, 3 for slightly affected, and 5 for excellent.

All coating layers exhibited excellent water resistance.

TABLE 1

| Composition | Persoz Hardness (sec) after ageing during 7 days | Resistance to methylethylketone (MEK) after ageing during | | Resistance to water after ageing during 7 days |
| --- | --- | --- | --- | --- |
| | | 2 days | 7 days | |
| A | 59 | 3 | 3 | 5 |
| B | 34 | 3 | 3 | 5 |

We claim:

1. An aqueous-based cross-linkable binder composition comprising
(A) an aqueous dispersion of an aldehyde-functional polyurethane having a number average molecular weight of more than 1,000 and an average aldehyde functionality of ≧2, which polyurethane comprises ionic and/or non-ionic dispersing groups, and (B) a low-molecular weight aldehyde-reactive cross-linker selected from the group of low-molecular weight polyamines, and low-molecular weight compounds comprising at least one group of one of the formulae $E^1$—$CHR^1$—$E^2$ and H—C—($E^1E^2E^3$), wherein —$E^1$, —$E^2$ and —$E^3$ are independently chosen from electron-withdrawing groups and wherein $R^1$ has the meaning of hydrogen or a hydrocarbon radical having 1 to 10 carbon atoms.

2. The aqueous-bused cross-linkable binder composition according to claim 1, wherein the cross-linker comprises acetoacetate groups.

3. The aqueous-based cross-linkable binder composition according to claim 1, wherein the number average molecular weight of the aldehyde-functional polyurethane is within the range of from 1,000 to 100,000.

4. The aqueous-based cross-linkable binder composition according to claim 1, wherein the polyurethane is obtained by reaction of:
  a) an organic polyisocyanate,
  b) an organic compound containing at least two isocyanate-reactive groups and having a number average molecular weight in the range of 400 to 6,000,
  c) (a) mono-functional and/or poly-functional isocyanate-reactive compound(s) bearing nonionic and/or ionic dispersing groups (or groups which may subsequently be converted into ouch dispersing groups),
  d) an isocyanate-reactive aldehyde-functional compound,
  e) optionally, an organic polyol having a weight average molecular weight of less than 400, and
  f) optionally, active hydrogen-containing chain extending material.

5. The aqueous-based cross-linkable binder composition according to claim 4, wherein the ionic dispersing group is an anionic dispersing group selected from the group consisting of carboxylate, sulphonate and phosph(on)ate salt groups.

6. The aqueous-based cross-linkable binder composition according to claim 4, wherein the for the nonionic dispersing group use is made of a $C_1$–$C_4$ alkoxy poly $C_2$–$C_3$ alkylene-oxide group in an amount between 2.5 and 20 wt. %, based on the polyurethane.

7. The aqueous-based cross-linkable binder composition according to claim 6, wherein the $C_1$–$C_4$ alkoxy poly $C_2$–$C_3$ alkylene-oxide group is used in an amount between 5 and 15 wt. %.

8. The aqueous-based cross-linkable binder composition according to claim 1, wherein the aldehyde-functional polyurethane to low-molecular weight aldehyde-reactive cross-linker equivalence ratio, based on the aldehyde-reactive groups of the low-molecular weight cross-linker and the aldehyde groups of the polyurethane, is in the range of from 0.5:1 to 5:1.

9. The aqueous-based cross-linkable binder composition according to claim 2, wherein the acetoacetate cross-linker is selected from the group consisting of trim thylol propane triacetoacetate and trimethylol ethane triacetoacetate.

10. The aqueous-bused cross-linkable binder composition according to claim 1, wherein the polyamine cross-linker is selected from the group consisting of α, ω-alkylene diamines having from 2 up to 20 carbon atoms in the alkylene group, cyclohexylene diamines, 2-methyl piperazine, isophorone diamine, adducts of a (poly)amino compound to a polyfunctional epoxy, isocyanate, maleinate, fumarate or (meth)acryloyl compound, and hydrogenated polynitro or polynitrile compounds.

11. The aqueous-based cross-linkable binder composition according to claim 10, wherein the polyamine cross-linker is 3-[2,2-bis-(3-amino-propoxymethyl)-butoxy]-propylamine.

12. A method of using the binder composition according to claim 1 in the production of primer compositions or clear coat compositions.

13. A method of using the binder composition according to claim 1 in the refinishing of cars.

14. Aqueous-based cross-linkable binder composition according to claim 1, wherein the electron withdrawing groups are selected from the group consisting of P(=O)—O—, —CO—, —CN—, —$SO_2$—, and —$NO_2$.

* * * * *

UNITED STATES PATENT AND TRADEMARK OFFICE
CERTIFICATE OF CORRECTION

PATENT NO. : 6,765,056 B2
DATED : July 20, 2004
INVENTOR(S) : Hobel et al.

It is certified that error appears in the above-identified patent and that said Letters Patent is hereby corrected as shown below:

Column 13,
Line 27, "ouch" should read -- such --

Column 14,
Line 16, "trim thylol" should read -- trimethylol --

Signed and Sealed this

Twenty-eighth Day of December, 2004

JON W. DUDAS
*Director of the United States Patent and Trademark Office*